J. A. SMITH.
Slate-Washer.

No. 223,612.  Patented Jan. 13, 1880.

Attest,
W. H. H. Knight
Floyd Norris

Inventor,
Jacob A. Smith
by Johnson & Johnson
Attys

UNITED STATES PATENT OFFICE.

JACOB A. SMITH, OF SALEM, OHIO, ASSIGNOR OF ONE-HALF OF HIS RIGHT TO CHARLES F. KESSELMIRE, OF SAME PLACE.

SLATE-WASHER.

SPECIFICATION forming part of Letters Patent No. 223,612, dated January 13, 1880.

Application filed December 1, 1879.

*To all whom it may concern:*

Be it known that I, JACOB A. SMITH, of Salem, in the county of Columbiana and State of Ohio, have invented certain new and useful Improvements in Slate Washers and Driers, of which the following is a specification.

I have devised an improved slate washer and drier for use in schools, and which is formed of two pieces or sides of sheet metal of equal size, each stamped out by a suitable die, so as to form a semi-cylindrical cavity crosswise between its ends, one of said ends having a curved cut-out lip, and the other an offset or angular termination, there being left in each piece or side a cross flat part by which they are joined, so as to form a tubular part open at both ends, and to bring the cut-out end lips and the opposite end offsets coincident, to form an open grasp for the sponge communicating with the tubular part, so that the sponge contained in the latter will project through and beyond this grasp part as a washer, and a grasp on the opposite side of the tube to receive and hold the drier, the joining flat parts being between said drier-grasp and the tube, thus forming diametrical projecting long narrow washer and drier grasps, with a holder for a sponge saturated only, and thus avoid the use of a water-reservoir and the wetting of the slate with a surplus of water, as in similar devices.

The tubular part is joined at each end of the washer-grasp by lapping and soldering cut end strips formed in stamping out the washer-grasp lips. The sponge is inserted into the tube through the communicating grasp, and the drier, of cloth or other suitable material, being inserted between the clamp-forming offset terminations, is confined therein as between jaws, by pressing them together. The ends of the tubular part are closed by cork stoppers to confine the moisture and to cause the inclosed supply part of the sponge to give out its moisture under the friction produced by the rubbing the washer over the slate.

My device forms an improved manufacture, embracing a dampened washer and a dry wiper, secured within grasps formed by sheet metal stamped out in separate pieces and joined together flatwise at a point crosswise between the tubular sponge-holding part and the drier-grasp.

Figure 1:
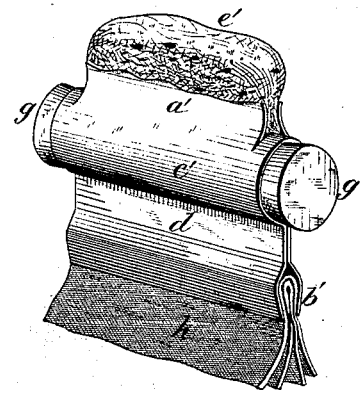
Figure 2:
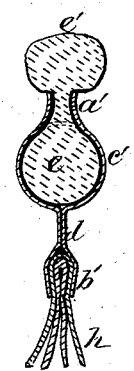
Figure 3:
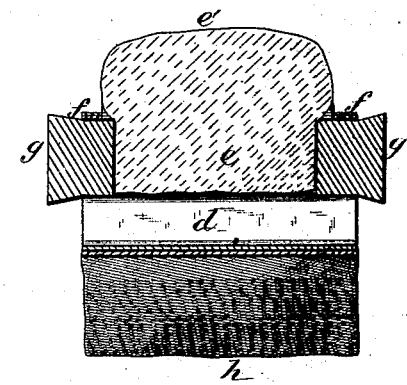
Figure 4:
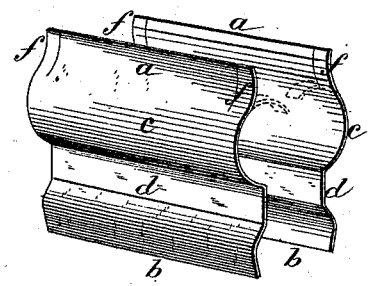

Referring to the accompanying drawings, which form part of this specification, I have shown my improved slate washer and drier in perspective in Figure 1, in cross-section in Fig. 2, in section in line of the joining of the stamped sides or pieces in Fig. 3, and a view in perspective of the formed pieces or sides before they are joined in Fig. 4.

The device is formed of two pieces or sides of sheet metal, of equal size, stamped by suitable dies, so as to form a cut-out curved lip, $a$, at one end, an offset or angular termination, $b$, at the opposite end, and an intermediate parallel semi-tubular part, $c$, each piece being the counterpart of the other, and each having a flat part, $d$, whereby the two pieces or sides are joined flatwise and secured by soldering at this flat joining $d$ in a manner to bring the formed parts coincident, and thereby form the tubular part $c'$ for the supply-sponge $e$, the groove-like grasp $b'$ for the drier on one side of the part $c'$, leaving the grasp $a'$ for the washer part $e'$ of the sponge projecting from the opposite side of said tube, and said washer-sponge part extending beyond the curved projecting lips, so that it forms a part of that inclosed within the tube, and draws its moisture from said inclosed part.

In stamping out each piece or side, the forming of the curved lips $a$ $a$ leaves a short cut edge strip, $f$, at the ends of the semi-cylindrical cavity, which are lapped and joined by solder to complete the open-ended tube, and this soldering at the tube ends I prefer to make after the joining of the flat parts. The open ends of the tube are closed by corks $g$ $g$, for the purpose of confining the moisture of the supply part of the sponge.

The space between the curved cut-out lips is about one-fourth of an inch when the pieces are joined, and the sponge is inserted into the tube through the opening formed by said cut-out lips, being first trimmed dry, so as to fill the tube, and leave a part of the sponge projecting beyond the lips to form the washer.

The drier $h$ is formed of several thicknesses of material, such as thick cloth, so as to present a number of open folds or separate edges, and it is inserted endwise in the groove formed by the angular terminations $b$, the edges of which are then pressed in slightly upon the fabric to hold it like a clamp.

A folded piece of chamois-skin, or any other suitable material, may be used for the drier, and it can be replaced by a new wiper when desired.

The inclosed part of the sponge is saturated by holding the projecting washer part in water, and to effect this rapidly the corks are removed. After the sponge is saturated the open ends of the tube are closed, and the washer-sponge part $c'$ squeezed to deprive it of its surplus water. The tube thus sealed by the corks will cause the saturated sponge therein to supply the washer part with sufficient moisture for the day's use by the friction in rubbing, as a slate requires very little moisture to clean it.

The device formed in this manner gives a long narrow dampened washer and a separate dry-wiper surface, and is better adapted for the purpose, and much cheaper, and more quickly formed than a double-ended water reservoir case having a washer at one end in communication with the water-reservoir and a dry wiper at the other end.

A sponge inclosed within a case having openings in its ends and saturated with water has been used in connection with a fabric wiper inclosing a part of the sponge and extending through between projecting lips in the side of the case in a manner to form both a washer and a wiper; but in practice this leaves the slate too wet for immediate use, and requires it to be wiped dry.

I claim—

1. In a slate washer and drier, the sheet-metal sides, each formed with a semi-tubular part, $c$, cut-out end curved lip, $a$, an angular termination, $b$, and a parallel intermediate flat surface, $d$, and united at the flat joinings to form the separate side grasps, $a'$ $b'$, for the sponge washer and the drier, and an intermediate tubular part, $c'$, in combination with the sponge inclosed within said tubular part and projecting through between the said lips to form the washer, substantially as herein set forth.

2. In a slate washer and wiper, the sheet-metal sides, stamped out to form the tubular part and the terminal side grasps for the sponge washer and the wiper, substantially as herein set forth, said sponge-grasp being formed by stamped-out lips $a$, with the edge strips $f$ $f$ at the ends of said tubular part, whereby the open ends of said tubular part are united to form the grasp for the exposed part of the inclosed sponge.

3. As an improved manufacture, the herein-described slate washer and drier, consisting of the stamped-out sides, joined flatwise to form the open-ended tubular part for the moisture-supplying sponge, the side grasps for the washer and the drier, and the corks for closing the open ends of said tubular part, substantially as herein set forth.

In testimony whereof I have hereunto set my hand.

JACOB A. SMITH.

Witnesses:
　MARK. A. NEARE,
　JACOB GOODBRAKE.